United States Patent [19]

Amano et al.

[11] Patent Number: 6,090,906
[45] Date of Patent: Jul. 18, 2000

[54] POLYCARBODIIMIDE COPOLYMER AND PROCESS FOR PRODUCTION THEREOF

[75] Inventors: Satoshi Amano; Norimasa Nakamura, both of Tokyo, Japan

[73] Assignee: Nisshinbo Industries, Inc., Tokyo, Japan

[21] Appl. No.: 09/268,313

[22] Filed: Mar. 16, 1999

[30] Foreign Application Priority Data

Mar. 20, 1998 [JP] Japan .................................. 10-092724

[51] Int. Cl.$^7$ .......................... C08G 73/00; C08G 18/00; C08L 49/00
[52] U.S. Cl. .............................. 528/170; 528/44; 528/48; 528/51; 528/67; 528/310; 528/322; 524/710; 524/872; 524/873
[58] Field of Search ................................... 528/44, 48, 51, 528/67, 170, 310, 322; 524/710, 872, 873

[56] References Cited

U.S. PATENT DOCUMENTS

| | | | |
|---|---|---|---|
| 4,042,558 | 8/1977 | Von Bonin et al. | 528/44 |
| 4,067,820 | 1/1978 | Wagner et al. | 252/426 |
| 4,076,763 | 2/1978 | Thom et al. | 528/44 |
| 4,088,665 | 5/1978 | Findeisen et al. | 528/51 |
| 4,294,719 | 10/1981 | Wagner et al. | 252/182 |
| 4,344,855 | 8/1982 | Schäfer et al. | 528/67 |
| 4,424,288 | 1/1984 | Patton, Jr. et al. | 521/99 |
| 5,100,994 | 3/1992 | Amano et al. | 528/44 |
| 5,264,518 | 11/1993 | Amano | 528/44 |
| 5,416,184 | 5/1995 | Amano et al. | 528/44 |

*Primary Examiner*—P. Hampton-Hightower
*Attorney, Agent, or Firm*—Kubovcik & Kubovcik

[57] ABSTRACT

There are provided a polycarbodiimide copolymer having a main structure represented by the following formula (1):

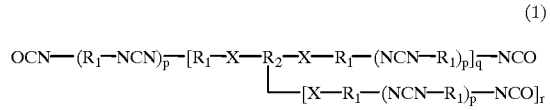

(1)

wherein $R_1$ is an isocyanate residue; $R_2$ is a polyfunctional liquid rubber residue; X is a urethane bond, an amide bond or a urea bond; p is an integer of 5 to 50; q is an integer of 1 to 5; and r is 0 or 1; and a process for producing the above polycarbodiimide copolymer, which comprises reacting a polyfunctional liquid rubber with an organic diisocyanate in excess of the rubber and then subjecting the diisocyanate components in the reaction system to carbodiimization using a carbodiimidization catalyst. The polycarbodiimide copolymer alleviates the problems of the prior art, has the excellent heat resistance inherently possessed by polycarbodiimide resins, is improved, as compared with conventional polycarbodiimide resins, in thermoformability under heating and pressure when made into a solid such as a powder or granules, and causes no blistering under heating.

7 Claims, 4 Drawing Sheets

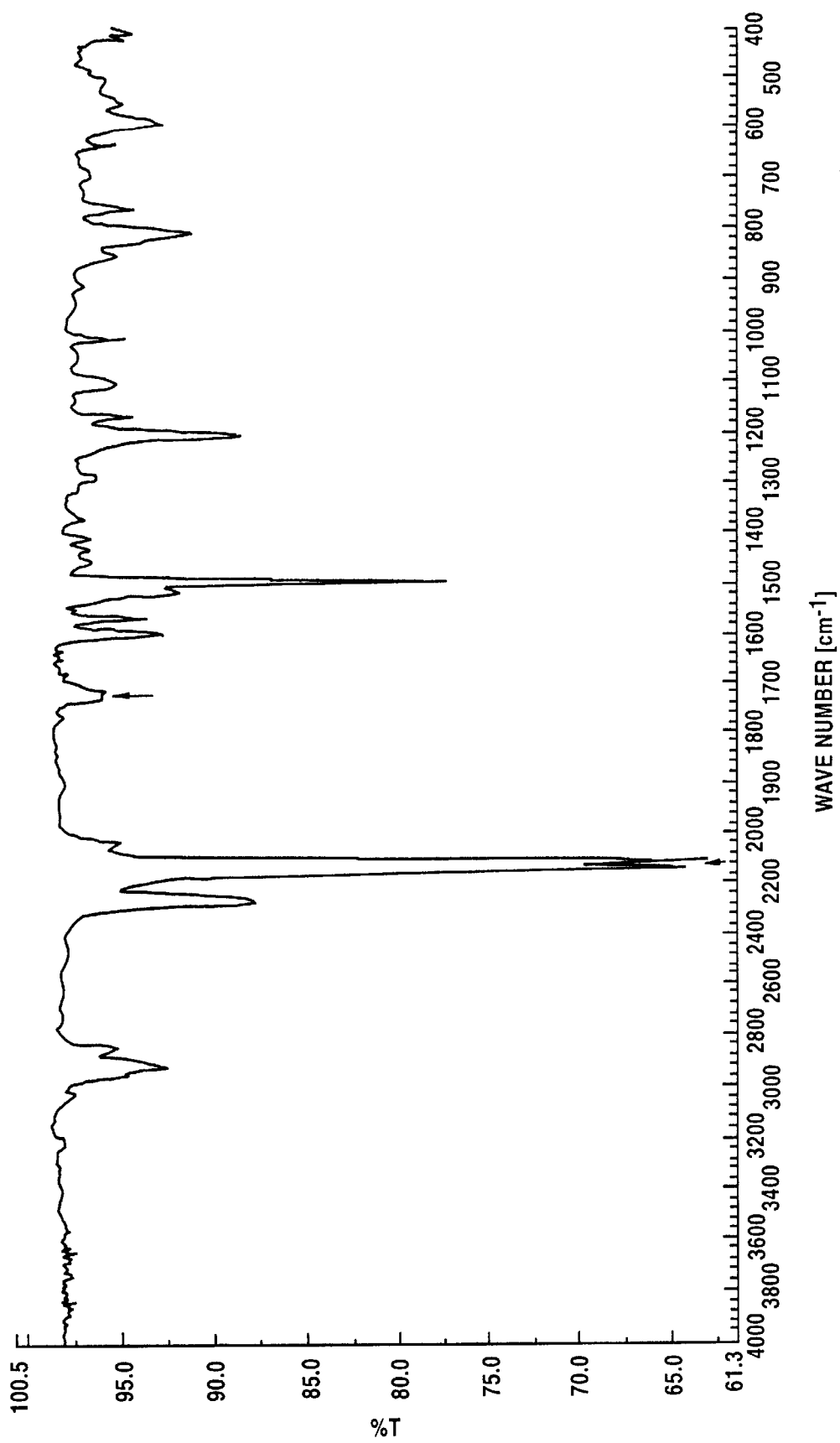

POLYCARBODIIMIDE COPOLYMER AND PROCESS FOR PRODUCTION THEREOF

BACKGROUND OF THE INVENTION

(1) Field of the Invention

The present invention relates to a polycarbodiimide copolymer and a process for production thereof. More particularly, the present invention relates to a polycarbodiimide copolymer wherein a liquid rubber structure is introduced in the main chain of a polycarbodiimide resin and which is improved, as compared with polycarbodiimide resins, in thermoformability when made into a solid such as a powder or granules while having the excellent heat resistance inherently possessed by polycarbodiimide resins, as well as to a process for producing the polycarbodiimide copolymer.

(2) Description of the Prior Art

Polycarbodiimide resins, particularly aromatic polycarbodiimide resins are known as a highly heat-resistant resin. Their varnishes, powders, etc. are in use as a molding material, a stabilizer to hydrolysis, etc. The powders and granules of polycarbodiimide resins, however, are known to be inferior in thermal flowability when used as a molding material.

With respect to the powders of polycarbodiimide resin, there is disclosed in, for example, J. Appl. Poly. Sci., 21, 1999 (1977) and JP-B-52-16759, a process for isolating a polycarbodiimide resin in a powdery state by reacting 4,4'-diphenylmethane diisocyanate with an organic monoisocyanate (a molecular weight regulator) in the presence of a carbodiimidization catalyst in an inert organic solvent.

That is, in the above J. Appl. Poly. Sci., it is described that the above reaction is conducted in a xylene solvent, then the reaction system is cooled to room temperature, the resulting solid precipitate is isolated by filtration, the filtrate is poured into an excess hexane, the resulting solid precipitate is isolated by filtration, and the two precipitates are combined and dried to obtain a powder (this powder is called "terminal-blocked polycarbodiimide"). In the above literature are also described the improved flowability under heating and pressure and other properties of the powder.

The powder of terminal-blocked polycarbodiimide resin contains low-molecular compounds such as monocarbodiimide [formed by reaction of two monoisocyanate molecules (monoisocyanate is a terminal blocking agent)], low-molecular carbodiimide and the like; therefore, when the powder is molded or used at high temperatures, the low-molecular compounds contained therein are vaporized to cause foaming and blistering or emit an offensive odor.

SUMMARY OF THE INVENTION

The present invention is intended to provide a polycarbodiimide copolymer which alleviates the problems of the prior art, has the excellent heat resistance inherently possessed by polycarbodiimide resins, is improved, as compared with conventional polycarbodiimide resins, in thermoformability under heating and pressure when made into a solid such as a powder or granules, and causes no blistering under heating; and a process for producing the above polycarbodiimide copolymer.

According to the present invention there is provided a polycarbodiimide copolymer having a main structure represented by the following formula (1):

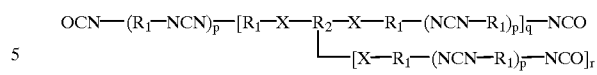

(1)

wherein $R_1$ is an isocyanate residue; $R_2$ is a polyfunctional liquid rubber residue; X is a urethane bond, an amide bond or a urea bond; p is an integer of 5 to 50; q is an integer of 1 to 5; and r is 0 or 1.

According to the present invention there is also provided a process for producing the above polycarbodiimide copolymer, which process comprises reacting a polyfunctional liquid rubber with an organic diisocyanate in a large excess over the rubber and then subjecting the diisocyanate components in the reaction system to carbodiimization using a carbodiimidization catalyst.

BRIEF DESCRIPTION OF THE DRAWINGS

FIG. 4 is an IR spectrum of the polycarbodiimide copolymer produced in Example 6.

DETAILED DESCRIPTION OF THE INVENTION

Figure 1:
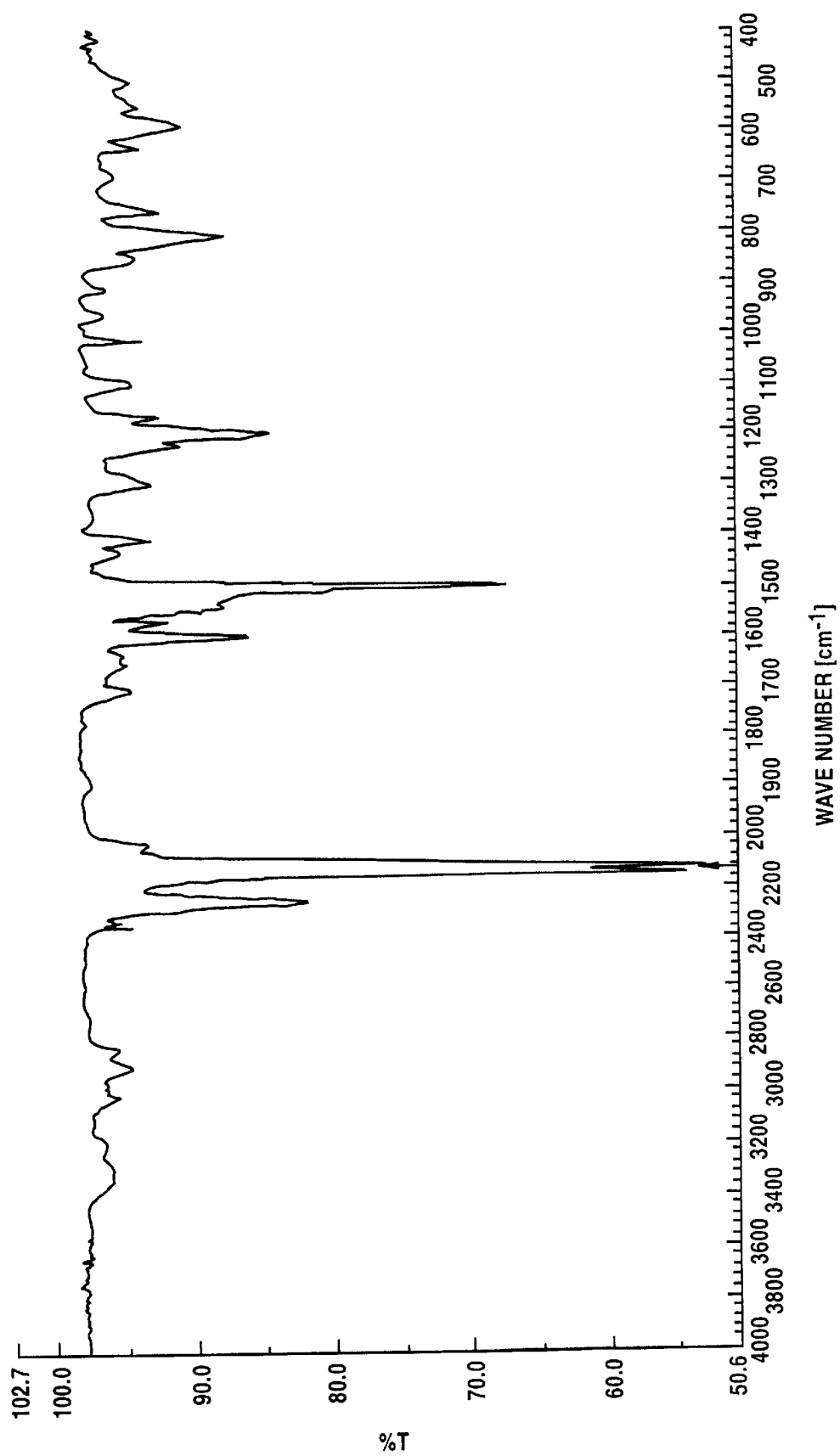
FIG. 1 is an IR spectrum of the polycarbodiimide copolymer produced in Example 1.

The present invention is hereinafter described in detail.

The polycarbodiimide copolymer of the present invention has a main structure represented by the above-mentioned formula (1). In the formula (1), $R_1$ is an isocyanate residue; $R_2$ is a polyfunctional liquid rubber residue; and X is a urethane bond, an amide bond or a urea bond.

The isocyanate residue ($R_1$) refers to a structure formed when two isocyanates are removed from an organic diisocyanate. The polyfunctional liquid rubber residue ($R_2$) refers to a structure formed when a plurality of functional groups for formation of urethane bonds, amide bonds or urea bonds are removed from a polyfunctional liquid rubber.

The organic diisocyanate used in the present invention may be an aromatic or aliphatic diisocyanate. An aromatic diisocyanate is preferred from the standpoint of reaction control.

Examples of the aromatic diisocyanate include 4,4'-diphenylmethane diisocyanate, 4,4'-diphenyl ether diisocyanate, p-phenylene diisocyanate, m-phenylene diisocyanate, 3,3'-dimethoxy-4,4'-biphenyl diisocyanate, o-tolidine diisocyanate, naphthylene diisocyanate, 2,4'-tolylene diisocyanate and 2,6'-tolylene diisocyanate.

Examples of the aliphatic diisocyanate include hexamethylene diisocyanate, 2,2,4-trimethylhexamethylene diisocyanate, 4,4'-dicyclohexylmethane diisocyanate, xylylene diisocyanate, tetramethylxylylene diisocyanate, isophorone diisocyanate, cyclohexyl diisocyanate, lysine diisocyanate and methylcyclohexane-2,4-diisocyanate.

The polycarbodiimide copolymer of the present invention can be obtained in the form of, for example, a varnish, powders or granules. When obtained in the form of powders or granules, the organic diisocyanate used is preferably a solid at around room temperature (20° C.).

The organic diisocyanate which is solid at around room temperature can be exemplified by 4,4'-diphenylmethane diisocyanate, o-tolidine diisocyanate, 4,4'-diphenyl ether diisocyanate and phenylene diisocyanate. Of these, 4,4'-diphenylmethane diisocyanate is particularly preferred in view of the wide usability. These diisocyanates may be used singly or in admixture of two or more kinds.

The polyfunctional liquid rubber used in the present invention is a liquid rubber having, in the molecule, two or more functional groups reactive with isocyanate. Such functional groups include —OH, —COOH, —NH$_2$, —NHR, —SO$_3$H, —SH, —NHCONH$_2$, —NHCOOR, etc. Of these, —OH, —COOH, —NH$_2$ and —NHR are particularly preferred in view of the reactivity and utilizability.

In order for the present invention to be able to exhibit its merits effectively, the polyfunctional liquid rubber is desired to have a molecular weight of 200 or more. When the molecular weight is less than 200, the resulting polycarbodiimide copolymer has low flexibility; moreover, the unreacted low-molecular compounds in the copolymer vaporize during the thermoforming of the copolymer and give, in some cases, an adverse effect on the molded product.

The polyfunctional liquid rubber can be exemplified by liquid polybutadienes [e.g. Hycar CTB (trade name) of Ube Industries, ltd. and Nisso PB (trade name) of Nippon Soda Co., Ltd.], liquid polybutadiene-acrylonitrile copolymers [e.g. Hycar CTBN and ATBN (trade names) of Ube Industries, Ltd.], liquid polyisoprenes [e.g. Kuraprene LIR-403 (trade name) of Kuraray Co., Ltd.], liquid hydrogenated polyisoprenes, liquid polysulfides and liquid silicones. Of course, modified products thereof can also be used.

Of the above polyfunctional liquid rubbers, Kuraprene LIR-403 (trade name) of Kuraray Co., Ltd. has three carboxyl groups in the molecule.

The polyfunctional liquid rubber residue ($R_2$) can be exemplified by the following residues.

Residue of liquid polybutadiene-acrylonitrile copolymer:

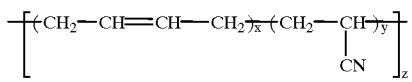

Residue of liquid polybutadiene:

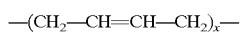

Residue of liquid polyisoprene:

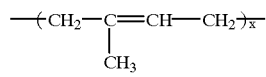

In the above formulas, x, y and z refer to the following integers.

In the liquid polybutadiene-acrylonitrile copolymer, $4 \leq (x+y), 1z$ in the polybutadiene, $4 \leq x$ and in the polyisoprene, $3 \leq x$ In the formula (1), p (which indicates the polymerization degree of the moiety structure NCN-$R_1$) is an integer of 5 to 50. When p is less than 5, the resulting polycarbodiimide copolymer has no properties inherently possessed by polycarbodiimide resins and is impossible to take out in the form of a powder or granules. When p is more than 50, it is highly probable that the resulting polycarbodiimide copolymer causes gelation during synthesis.

In the formula (1), q (which indicates the polymerization degree of the moiety structure [$R_1$—X—$R_2$—X—$R_1$—(NCN—$R_1$)$_p$]$_q$) is an integer of 1 to 5. When q is 0, the resulting polycarbodiimide copolymer is a conventional polycarbodiimide and is not a polymer of the formula (1). When q is more than 5, the resulting polycarbodiimide copolymer has too large a molecular weight and it is highly probable that the copolymer causes gelation during synthesis.

In the formula (1), r (which indicates the polymerization degree of the moiety structure [X—$R_1$—(NCN—$R_1$)$_p$—NCO]$_r$) is 0 or 1. When r is 0, the resulting copolymer is a linear polycarbodiimide copolymer of the present invention. When r is 2 or more, the resulting copolymer has many crosslinking sites and it is highly probable that the copolymer causes gelation during synthesis or storage.

The polycarbodiimide copolymer of the present invention can be produced by the production process of the present invention which comprises reacting a polyfunctional liquid rubber with an organic diisocyanate in excess over the rubber and then subjecting the diisocyanate components in the reaction system to carbodiimization using a carbodiimidization catalyst.

The organic diisocyanate and polyfunctional liquid rubber both used in the production process of the present invention have been described above.

"The diisocyanate components in the reaction system" refer mainly to 1. the organic diisocyanate which did not take part in the reaction, and
2. polyfunctional liquid rubber derivatives having, in the molecule, two or more isocyanate groups, formed by the reaction of the polyfunctional liquid rubber with the organic diisocyanate, and further to
3. a polyfunctional liquid rubber derivative having one isocyanate group in the molecule, formed by the reaction of the polyfunctional liquid rubber with the organic diisocyanate.

The probability of the presence of the derivative 3 is very low. The derivative 3 reacts with the organic diisocyanate 1 which did not take part in the reaction (i.e. excessive organic diisocyanate), and becomes the derivative 2 and is carbodiimidized.

In the present production process, the organic diisocyanate is used in an excess of the polyfunctional liquid rubber. This "excess" can be as follows, for example.

$7 \leq$ (number of isocyanate groups)/—(number of active hydrogen atoms in the polyfunctional liquid rubber)

The present production process is characterized in that an organic diisocyanate is reacted with a polyfunctional liquid rubber and then a carbodiimidization catalyst is added to synthesize a polycarbodiimide copolymer. If this sequence is reversed and the reaction with a polyfunctional liquid rubber is conducted during or after the synthesis of a polycarbodiimide resin, the functional groups of liquid rubber react not only with isocyanate groups but also with carbodiimide groups and gelation takes place at a high probability, making it very difficult to obtain an intended copolymer.

The reaction of organic diisocyanate with polyfunctional liquid rubber in the present production process can be conducted in bulk (using no solvent) because the reaction system causes no solidification or gelation during the reaction. If the reaction system causes solidification or gelation during the bulk reaction of the two materials, an appropriate solvent may be used in the reaction.

The solvent is preferably one capable of dissolving all of the organic diisocyanate (raw material), the polyfunctional liquid rubber (raw material), reaction products thereof and polycarbodiimide copolymers obtained by carbodiimidization of the reaction products. Such a solvent includes, for example, alicyclic ethers (e.g. tetrahydrofuran and dioxane) and aromatic hydrocarbons (e.g. benzene and toluene). Of these, tetrahydrofuran is particularly preferred. These solvents may be used singly or in admixture of two or more kinds.

The reaction temperature used in the reaction of the organic diisocyanate with the polyfunctional liquid rubber is preferably 30 to 180° C. although it differs depending upon the kind of functional group reacted with the isocyanate groups. The reaction temperature is more preferably 50 to 150° C. when the shortening of reaction time or the prevention of thermal degradation of liquid rubber is taken into consideration. When a reaction solvent is used, the reaction temperature is desirably 50° C. to the boiling point of the solvent.

The temperature of the carbodiimidization reaction is determined by the kind of solvent and the concentrations of monomers but is preferably 50° C. to the boiling point of solvent.

The carbodiimidization catalyst can be a known catalyst and includes, for example, phosphorene oxides such as 3-methyl-1-phenyl-2-phosphorene-1-oxide, 3-methyl-1-phenyl-3-phosphorene-1-oxide, 3-methyl-1-ethyl-2-phosphorene-1-oxide and the like. Of these, 3-methyl-1-phenyl-2-phosphorene-1-oxide is preferred for the reactivity. The amount of the catalyst is preferably 0.1 to 1.0% by weight based on the organic diisocyanate used.

The solids content in the carbodiimidization is preferably 5 to 50% by weight based on the total weight of the reaction system and, more preferably, 20 to 30% by weight. When the solids content is less than 5% by weight, a large amount of a poor solvent is required (this is uneconomical) when, as mentioned later, the poor solvent is added to precipitate the polycarbodiimide copolymer. When the solids content is more than 50% by weight, gelation or solidification takes place at a high probability in the course of polymerization (this brings about inconvenience).

For obtaining the polycarbodiimide copolymer of the present invention in the form of a powder or granules, a known method can be used. That is, to the polycarbodiimide copolymer solution is added a poor solvent for the copolymer to precipitate the copolymer in the form of a solid, and the precipitate is filtered or subjected to spray drying to obtain a powder or granules.

The poor solvent is preferably a poor solvent having a boiling point as low as possible, in view of the economy of drying the powdery or granular polycarbodiimide copolymer obtained. Such a poor solvent includes, for example, aliphatic hydrocarbons, esters, ethers and ketones. Specifically, the aliphatic hydrocarbons are pentane, hexane, heptane, octane, nonane, etc.; the esters are methyl acetate, ethyl acetate, isopropyl acetate, butyl acetate, ethyl propionate, methyl butyrate, ethyl butyrate, etc.; the ethers are diethyl ether, dibutyl ether, isopropyl ether, etc.; and the ketones are acetone, methyl ethyl ketone, diethyl ketone, methyl propyl ketone, methyl isobutyl ketone, methyl isopropyl ketone, etc. These solvents can be used singly or in an admixture of two or more kinds.

The amount of poor solvent added varies depending upon the kind of poor solvent and the solids content in the polycarbodiimide copolymer solution, but is appropriately 0.5 to 10 times the weight of the polycarbodiimide copolymer solution. When the amount of poor solvent used is less than 0.5 time the weight of the polycarbodiimide copolymer solution, it is difficult to obtain the polycarbodiimide copolymer in the form of a powder or granules. When the amount is more than 10 times, the productivity of polycarbodiimide copolymer is low.

The timing of addition of the poor solvent may be right after the polymerization reaction or after cooling of the polycarbodiimide copolymer solution. In order to achieve quick precipitation of powder or granules, it is preferred that the polycarbodiimide copolymer solution is cooled to 5 to 20° C., then the poor solvent is added, and stirring is conducted at 5 to 20° C. for 1 to 10 hours.

Of course, the polycarbodiimide copolymer produced in the present process can be obtained also in the form of, for example, a varnish.

It is easily anticipated that by using the present production process, a terminal-blocked polycarbodiimide copolymer and a powder thereof can be produced as well.

The polycarbodiimide copolymer produced by the present process can be applied as, for example, a modifier (e.g. adhesivity improver or heat resistance improver) for an epoxy resin or phenolic resin. It is also possible to mold the resulting mixture (mixture of epoxy or phenolic resin and polycarbodiimide copolymer) by a known molding method such as transfer molding, extrusion molding, compression molding, injection molding or the like to use the molded product in various industrial applications.

The present invention is described in more detail below by way of Examples. However, the present invention is not restricted to these Examples.

EXAMPLE 1

Into a 3-liter separable flask provided with a stirrer and a condenser was fed 150 g of 4,4'-diphenylmethane diisocyanate (hereinafter referred to as "MDI") dissolved in 400 g of tetrahydrofuran (hereinafter referred to as "THF"). Thereto was dropwise added, at room temperature, a solution of 21.6 g of ATBN (trade name) (amine-terminated NBR marketed by Ube Industries., Ltd.) dissolved in 200 g of THF. After the completion of the dropwise addition, a reaction was conducted at 75° C. for 4 hours. The reaction mixture was measured for IR spectrum, which indicated absorption of urea at 1,638 $cm^{-1}$. Then, 0.45 g of 3-methyl-1-phenyl-2-phosphorene-1-oxide was added, and a carbodiimidization reaction was conducted at 75° C. for 5.5 hours. The reaction mixture was measured for IR spectrum, which indicated absorption of carbodiimide at 2,110 $cm^{-1}$ as shown in FIG. 1. Thereafter, the system was cooled and, when the solution temperature became 10° C., 800 g of n-hexane were added with stirring. After continuing cooling and stirring for a while, a slurry was obtained. The slurry was subjected to vacuum filtration using a Buchner funnel to obtain a wet cake. The wet cake was placed in a mortar, disintegrated gently, and dried at 70° C. under vacuum for 5 hours to obtain a white powder. The powder was measured for melting point by DSC, and the melting point was 121° C. This powder was judged to be a copolymer of the formula (1) wherein x=urea bond, p=25, q=1 and r=0. The copolymer was also measured for number-average molecular weight, and the molecular weight (Mn) was $4.1 \times 10^3$ (a value measured by gel permeation chromatography and polystyrene-reduced, the same applies hereinafter as well).

EXAMPLE 2

The same synthesis apparatus as used in Example 1 was used. From the material inlet of the apparatus were fed 240 g of MDI and 33.6 g of CTBN (trade name) (a carboxyl-terminated NBR marketed by Ube Industries, Ltd.). A reaction was conducted at 130° C. for 5 hours. Thereto were added 560 g of THF and 0.48 g of 3-methyl-1-phenyl-2-phosphorene-1-oxide, and a carbodiimidization reaction was conducted at 75° C. for 2.75 hours. The reaction mixture was measured for IR spectrum, which indicated absorption of carbodiimide at 2,110 cm$^{-1}$. After the completion of the reaction, the system was cooled. When the solution temperature became 10° C., 1,000 g of n-hexane were added. After continuing cooling and stirring, a slurry was obtained. The slurry was filtered. The solid obtained was placed in a mortar, disintegrated gently, and dried at 70° C. under vacuum for 5 hours to obtain a white powder. The powder was measured for melting point by DSC, and the melting point was 116° C. This powder was judged to be a copolymer of the formula (1) wherein x=amide bond, p=50, q=1 and r=0. The copolymer was also measured for number-average molecular weight, and the molecular weight (Mn) was 4.4×10$^3$.

EXAMPLE 3

Figure 2:
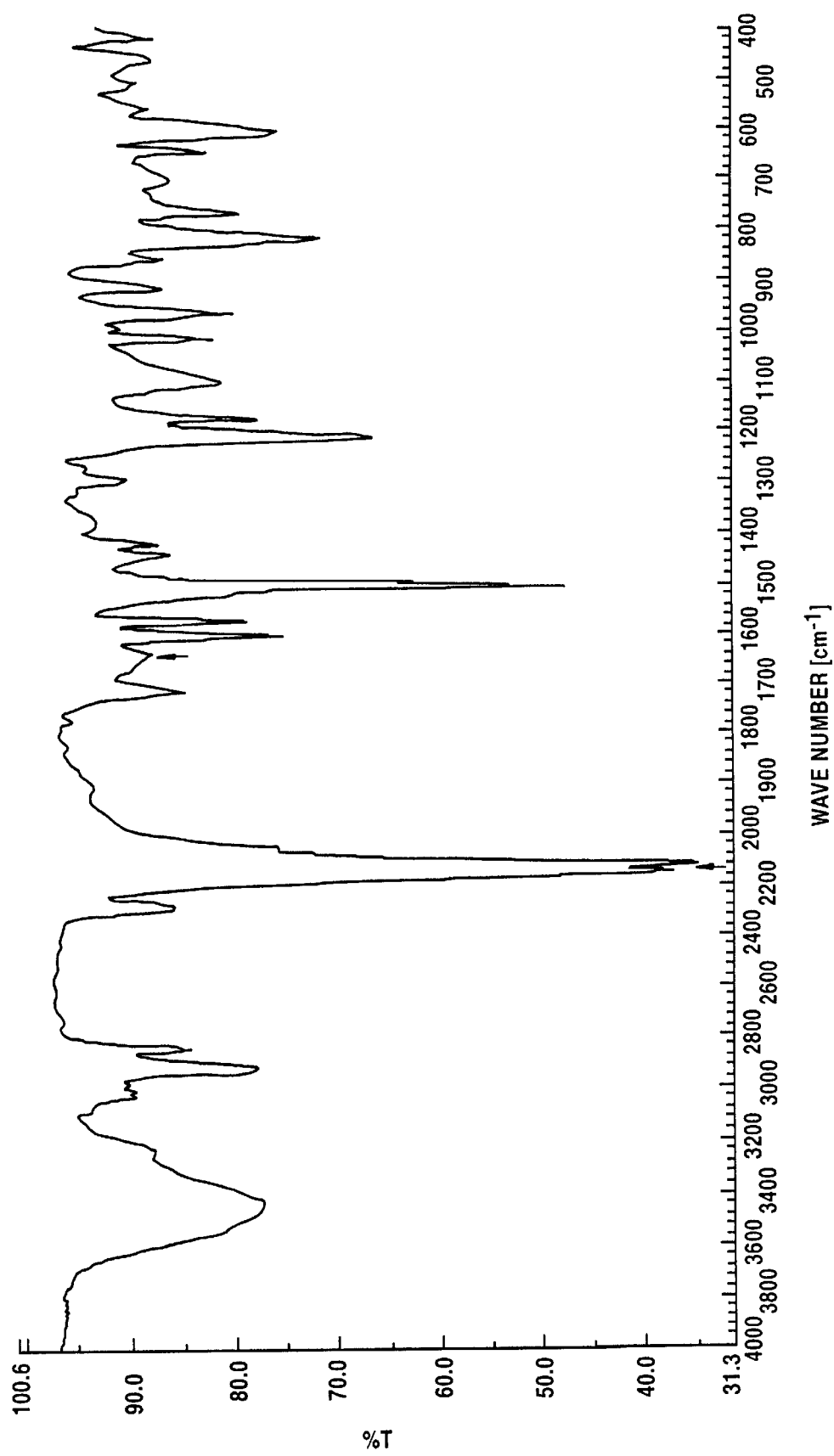
FIG. 2 is an IR spectrum of the polycarbodiimide copolymer produced in Example 3.

The same synthesis apparatus as used in Example 1 was used. From the material inlet of the apparatus were fed 125 g of MDI and 48 g of CTB (trade name) (a carboxyl-terminated liquid polybutadiene marketed by Ube Industries, Ltd.). A reaction was conducted at 130° C. for 5 hours. The reaction mixture was measured for IR spectrum, which indicated absorption of amide at 1,640 cm$^{-1}$. Then, 500 g of THF and 0.25 g of 3-methyl-1-phenyl-2-phosphorene-1-oxide were added, and a carbodiimidization reaction was conducted at 75° C. for 4.5 hours. The reaction mixture was measured for IR spectrum, which indicated absorption of carbodiimide at 2,110 cm$^{-1}$ as shown in FIG. 2. After the completion of the reaction, the system was cooled. When the solution temperature became 10° C., 1,000 g of acetone were added. After continuing cooling and stirring, a slurry was obtained. The slurry was filtered. The solid obtained was placed in a mortar, disintegrated gently, and dried at 70° C. under vacuum for 5 hours to obtain a white powder. The powder was measured for melting point by DSC, and the melting point was 132° C. This powder was judged to be a copolymer of the formula (1) wherein x=amide bond, p=25, q=1 and r=0. The copolymer was also measured for number-average molecular weight, and the molecular weight (Mn) was 4.6×10$^3$.

EXAMPLE 4

The operation of Example 3 was repeated except that the amount of CTB used was changed to 24 g. The white powder obtained was judged to be a copolymer of the formula (1) wherein x=amide bond, p=50, q=1 and r=0. The copolymer was also measured for number-average molecular weight, and the molecular weight (Mn) was 4.4×10$^3$.

EXAMPLE 5

Figure 3:
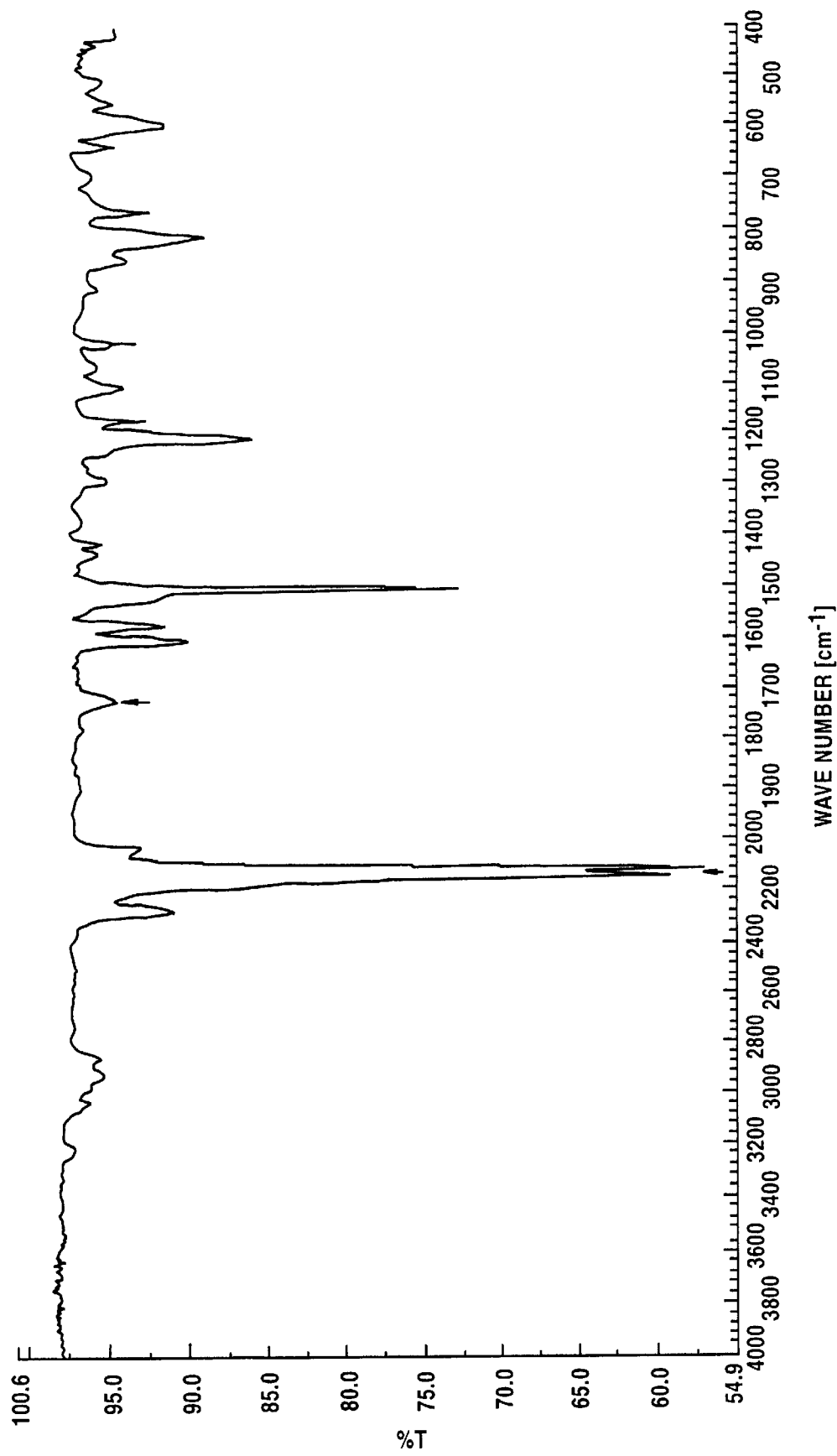
FIG. 3 is an IR spectrum of the polycarbodiimide copolymer produced in Example 5.

The same synthesis apparatus as used in Example 1 was used. From the material inlet of the apparatus were fed 300 g of MDI and 22.4 g of TL-20 (trade name) (a hydroxyl-terminated liquid polyisoprene produced by Kuraray Co., Ltd.). A reaction was conducted at 100° C. for 4.5 hours. The reaction mixture was measured for IR spectrum, which indicated absorption of urethane at 1,730 cm$^{-1}$. Then, 700 g of THF and 0.6 g of 3-methyl-1-phenyl-2-phosphorene-1-oxide were added, and a carbodiimidization reaction was conducted at 70° C. for 3 hours. The reaction mixture was measured for IR spectrum, which indicated absorption of carbodiimide at 2,110 cm$^{-1}$ as shown in FIG. 3. After the completion of the reaction, the system was cooled. When the solution temperature became 10° C., 530 g of n-hexane were added. After continuing cooling and stirring, a slurry was obtained. The slurry was filtered. The solid obtained was placed in a mortar, disintegrated gently, and dried at 70° C. under vacuum for 5 hours to obtain a white powder. The powder was measured for melting point by DSC, and the melting point was 133° C. This powder was judged to be a copolymer of the formula (1) wherein x=urethane bond, p=50, q=1 and r=0. The copolymer was also measured for number-average molecular weight, and the molecular weight (Mn) was 4.0×10$^3$.

EXAMPLE 6

The same synthesis apparatus as used in Example 1 was used. From the material inlet of the apparatus were fed 300 g of MDI and 32.4 g of TH-2 (trade name) (a hydroxyl-terminated liquid hydrogenated polyisoprene produced by Kuraray Co., Ltd.). A reaction was conducted at 100° C. for 3.5 hours. The reaction mixture was measured for IR spectrum, which indicated absorption of urethane at 1,730 cm$^{-1}$. Then, 1,000 g of THF and 0.6 g of 3-methyl-1-phenyl-2-phosphorene-1-oxide were added, and a carbodiimidization reaction was conducted at 70° C. for 4.5 hours. The reaction mixture was measured for IR spectrum, which indicated absorption of carbodiimide at 2,110 cm$^{-1}$ as shown in FIG. 4. After the completion of the reaction, the system was cooled. When the solution temperature became 10° C., 1,000 g of n-hexane were added. After continuing cooling and stirring, a slurry was obtained. The slurry was filtered. The solid obtained was placed in a mortar, disintegrated gently, and dried at 70° C. under vacuum for 5 hours to obtain a white powder. The powder was measured for melting point by DSC, and the melting point was 126° C. This powder was judged to be a copolymer of the formula (1) wherein x=urethane bond, p=40, q=1 and r=0. The copolymer was also measured for number-average molecular weight, and the molecular weight (Mn) was 4.2×10$^3$.

EXAMPLE 7

The same synthesis apparatus as used in Example 1 was used. From the material inlet of the apparatus were fed 500 g of tolylene diisocyanate and 107 g of TL-20. A reaction was conducted at 100° C. for 5 hours. The reaction mixture was measured for IR spectrum, which indicated absorption of urethane at 1,730 cm$^{-1}$. Then, 1,400 g of THF and 1.0 g of 3-methyl-1-phenyl-2-phosphorene-1-oxide were added, and a carbodiimidization reaction was conducted at 70° C. for 8 hours. The reaction mixture was measured for IR spectrum, which indicated absorption of carbodiimide at 2,137 cm$^{-1}$. The copolymer in the varnish obtained was judged to be a copolymer of the formula (1) wherein x=urethane bond, p=25, q=1 and r=0. The copolymer was also measured for number-average molecular weight, and the molecular weight (Mn) was 3.72×10$^3$.

Comparative Example 1

(Synthesis of Polycarbodiimide Powder)

The same synthesis apparatus as used in Example 1 was used. From the material inlet of the apparatus were fed 300 g of MDI and 560 g of THF. After MDI dissolved completely, 0.6 g of 3-methyl-1-phenyl-2-phosphorene-1-oxide was added and a carbodiimidization reaction was conducted at 70° C. for 3 hours. After the completion of the reaction, the system was cooled. When the solution temperature became 10° C., 1,500 g of ethyl acetate were added. After continuing cooling and stirring, a slurry was obtained. The slurry was filtered. The solid obtained was placed in a mortar, disintegrated gently, and dried at 70° C. under vacuum for 5 hours to obtain a white powder. The powder (polymer) was measured for number-average molecular weight, and the molecular weight (Mn) was $4.0 \times 10^3$.

Comparative Example 2

[Synthesis of Polycarbodiimide (Copolymer) Powder]

The same synthesis apparatus as used in Example 1 was used. From the material inlet of the apparatus were fed 400 g of MDI and 540 g of THF. Thereto was dropwise added a solution of 14.1 g of 1,4-diaminobutane dissolved in 200 g of THF, and a reaction to form a urea bond was conducted for 3 hours. Then, 0.8 g of 3-methyl-1-phenyl-2-phosphorene-1-oxide was added and a carbodiimidization reaction was conducted at 70° C. for 4.5 hours. After the completion of the reaction, the system was cooled. When the solution temperature became 10° C., 1,000 g of ethyl acetate were added. After continuing cooling and stirring, a slurry was obtained. The slurry was filtered. The solid obtained was placed in a mortar, disintegrated gently, and dried at 70° C. under vacuum for 5 hours to obtain a white powder. The powder (copolymer) was measured for number-average molecular weight, and the molecular weight (Mn) was $3.9 \times 10^3$.

Evaluation of Thermoformability of Polycarbodiimide Copolymers (in Conformity to JIS K6911 5.3.2)

To evaluate the thermoformability of the polycarbodiimide copolymer powders obtained above, each polycarbodiimide copolymer was measured for flowability under heating and pressure, as follows. First, a Teflon glass sheet of 15 cm×15 cm was placed on a press plate (surface temperature= 155° C.); in almost the center thereon was placed a metal cylinder of 3.4 cm in diameter; in the cylinder was placed 1.0 g of a powder of polycarbodiimide copolymer or the like, obtained in one of the above Examples and Comparative Examples; and the cylinder was removed gently (the powder formed a conical shape). Then, on the powder was placed a Teflon glass sheet of 15 cm×15 cm, and the sheet was pressed for 30 seconds with a force of 1.2 t to obtain a film. The film was measured for major axis length and minor axis length at the luster portion (transparent portion), and the average of the two lengths was calculated and taken as the "flowability" of the polycarbodiimide copolymer.

To obtain a film having 0.2 mm in thickness, 0.6–1.0 g of the powder of polycarbodiimide copolymer or the like obtained in one of the above Examples and Comparative Examples was heat-pressed in a same manner as in above evaluation. The flexibility of the film was examined by bending the above film by 180° and observing the appearance of cracking. The results are shown in Table 1.

Further, to confirm that the polycarbodiimide copolymer powders obtained above cause no foaming and blistering, the film obtained as above was placed on a press plate (surface temperature=200° C.) without applying pressure for 30 minutes, and a condition of the film was observed visually. The results are shown in Table 1.

TABLE 1

|  | Examples |  |  |  |  |  | Comp. Ex. |  |
|---|---|---|---|---|---|---|---|---|
|  | 1 | 2 | 3 | 4 | 5 | 6 | 1 | 2 |
| Flowability (mm) | 52 | 69 | 65 | 70 | 76 | 64 | 48 | —[1] |
| Flexibility[2] | o | o | o | o | o | o | o | x |
| Foaming or blistering | No | No | No | No | No | No | No | —[3] |

[1] The film was a sheet of white and opaque, and impossible to measure for flowability (in other Examples, a film was obtained.).
[2] o: No cracking   x: Cracked
[3] The film was impossible to measure.

The polycarbodiimide copolymer of Example 5 and the polycarbodiimide of Comparative Example 1 were measured for film formability (i.e., the lowest formable temperature) when only the surface temperature of the press plate was changed, according to the same method as used above. The results are shown in Table 2.

TABLE 2

|  |  | Plate surface temp. (° C.) |  |  |
|---|---|---|---|---|
|  |  | 120 | 130 | 140 |
| Example 5 | Film formability [1] | Δ | o | o |
|  | Flexibility [2] | o | o | o |
|  | Flowability (mm) | 49 | 51 | 58 |
| Comp. Ex. 1 | Film formability | — | x | x |
|  | Flexibility | — | x | Δ |
|  | Flowability (mm) | — | [3] | [3] |

[1] o: Film forming is possible. Δ: Film forming is possible but film transparency is slightly inferior. x: Film forming is impossible (a white opaque sheet is obtained).
[2] o: No cracking   Δ: Partially cracked   x: Completely cracked
[3] Impossible to measure As is clear from Table 1, the polycarbodiimide copolymer of the present invention has improved flowability because a polyfunctional liquid rubber structure of high flexibility is introduced into a relatively stiff carbodiimide main chain; therefore, the present polycarbodiimide copolymer has higher thermoformability than conventional polycarbodiimide resins and, moreover, can be made into a film having an excellent flexibility, and causing no foaming and blistering.

As is also clear from Table 2, the polycarbodiimide copolymer of the present invention can be made into a film even in a temperature range wherein filming of conventional polycarbodiimide resins has been impossible.

In addition, the process for producing a polycarbodiimide copolymer of the present invention is capble of producing the above polycarbodiimide copolymer easily; hence, the present polycarbodiimide copolymer and the process for production thereof have high industrial applicability, respectively.

What is claimed is:

1. A polycarbodiimide copolymer having a main structure represented by the following formula (1):

(1)

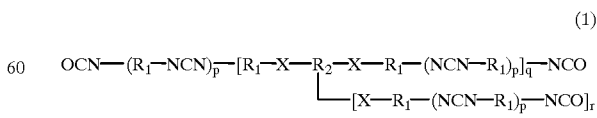

wherein $R_1$ is an isocyanate residue; $R_2$ is a polyfunctional liquid rubber residue; X is a urethane bond, an amide bond or a urea bond; p is an integer of 5 to 50; q is an integer of 1 to 5; and r is 0 or 1.

2. A polycarbodiimide copolymer according to claim 1, obtained by reacting a polyfunctional liquid rubber with an organic diisocyanate in excess of the rubber and then subjecting the diisocyanate components in the reaction system to carbodiimization using a carbodiimidization catalyst.

3. A polycarbodiimide copolymer according to claim 1, which is powdery or granular.

4. A process for producing a polycarbodiimide copolymer having a main structure represented by the following formula (1):

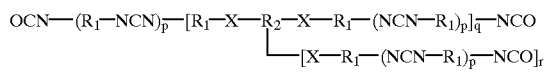
(1)

(wherein $R_1$ is an isocyanate residue; $R_2$ is a polyfunctional liquid rubber residue; X is a urethane bond, an amide bond or a urea bond; p is an integer of 5 to 50; q is an integer of 1 to 5; and r is 0 or 1), which process comprises reacting a polyfunctional liquid rubber with an organic diisocyanate in excess of the rubber and then subjecting the diisocyanate components in the reaction system to carbodiimization using a carbodiimidization catalyst.

5. A process according to claim 4, wherein the polycarbodiimide copolymer is powdery or granular.

6. A process according to claim 4, wherein a polymerization solvent is selected from the group consisting of alicyclic ethers, aromatic hydrocarbons and mixtures thereof.

7. A process according to claim 5, wherein a polymerization solvent is selected from the group consisting of alicyclic ethers, aromatic hydrocarbons and mixtures thereof.

* * * * *